United States Patent
Yamane

(10) Patent No.: US 10,741,860 B2
(45) Date of Patent: Aug. 11, 2020

(54) FUEL CELL APPARATUS, FUEL CELL SYSTEM, AND CONTROL METHOD FOR FUEL CELL SYSTEM

(71) Applicant: KYOCERA Corporation, Kyoto-shi, Kyoto (JP)

(72) Inventor: Takeshi Yamane, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 172 days.

(21) Appl. No.: 15/771,583

(22) PCT Filed: Oct. 28, 2016

(86) PCT No.: PCT/JP2016/004746
§ 371 (c)(1),
(2) Date: Apr. 27, 2018

(87) PCT Pub. No.: WO2017/073071
PCT Pub. Date: May 4, 2017

(65) Prior Publication Data
US 2018/0323454 A1    Nov. 8, 2018

(30) Foreign Application Priority Data
Oct. 29, 2015 (JP) .................... 2015-213386

(51) Int. Cl.
*H01M 8/04858* (2016.01)
*H02J 3/38* (2006.01)
(Continued)

(52) U.S. Cl.
CPC ... *H01M 8/04858* (2013.01); *H01M 8/04679* (2013.01); *H01M 8/04992* (2013.01);
(Continued)

(58) Field of Classification Search
None
See application file for complete search history.

(56) References Cited

U.S. PATENT DOCUMENTS

| 8,805,997 | B2 | 8/2014 | Takada et al. |
| 2006/0134479 | A1 | 6/2006 | Hu et al. |
| 2010/0211676 | A1 | 8/2010 | Takada et al. |

FOREIGN PATENT DOCUMENTS

| JP | 8-171919 A | | 7/1996 |
| JP | 08171919 A | * | 7/1996 |

(Continued)

*Primary Examiner* — Daniel S Gatewood
(74) *Attorney, Agent, or Firm* — Hauptman Ham, LLP

(57) ABSTRACT

A fuel cell apparatus corresponds to a first slave apparatus among a plurality of fuel cell apparatuses that includes a master apparatus and slave apparatuses including the first slave apparatus and a second slave apparatus. The first slave apparatus includes a cell stack, a communication unit, and a controller. The communication unit communicably connects to the master apparatus and the second slave apparatus. The controller controls the cell stack on the basis of control information acquired from the master apparatus. The controller transmits a master candidacy message indicating assumption by proxy of functionality of the master apparatus to the second slave apparatus from the communication unit when the controller detects that the master apparatus has lost functionality.

15 Claims, 5 Drawing Sheets

(51) Int. Cl.
*H02J 3/46* (2006.01)
*H01M 8/04664* (2016.01)
*H01M 8/04992* (2016.01)

(52) U.S. Cl.
CPC ............... *H02J 3/387* (2013.01); *H02J 3/46* (2013.01); *H02J 2300/30* (2020.01)

(56) References Cited

FOREIGN PATENT DOCUMENTS

JP 2002-247765 A 8/2002
WO 2010/044248 A1 4/2010

\* cited by examiner

FUEL CELL APPARATUS, FUEL CELL SYSTEM, AND CONTROL METHOD FOR FUEL CELL SYSTEM

CROSS-REFERENCE TO RELATED APPLICATION

The present application is a National Phase of International Application Number PCT/JP2016/004746 filed Oct. 28, 2016, which claims priority to Japanese Patent Application No. 2015-213386 filed Oct. 29, 2015, the entire contents of which are incorporated herein by reference.

TECHNICAL FIELD

The present disclosure relates to a fuel cell apparatus, a fuel cell system, and a control method for a fuel cell system.

BACKGROUND

Connected operation of power source apparatuses has been performed in a system including a plurality of power source apparatuses that interconnect generated electric power with a power grid. For example, see patent literature (PTL) 1. Improvement in the reliability of such systems is required with regard to the power supply to a load.

CITATION LIST

Patent Literature

PTL 1: JP 2002-247765 A

SUMMARY

A fuel cell apparatus according to an embodiment of the present disclosure corresponds to a first slave apparatus among a plurality of fuel cell apparatuses that includes a master apparatus and slave apparatuses including the first slave apparatus and a second slave apparatus. The fuel cell apparatus comprises a cell stack, a communication unit, and a controller. The communication unit communicably connects to the master apparatus and the second slave apparatus. The controller controls the cell stack on the basis of control information acquired from the master apparatus. The controller transmits a master candidacy message indicating assumption by proxy of functionality of the master apparatus to the second slave apparatus from the communication unit when the controller detects that the master apparatus has lost functionality.

A fuel cell system according to an embodiment of the present disclosure comprises a plurality of fuel cell apparatuses that includes a master apparatus and slave apparatuses including a first slave apparatus and a second slave apparatus. The master apparatus, the first slave apparatus, and the second slave apparatus each comprise a cell stack. The master apparatus, the first slave apparatus, and the second slave apparatus communicably connect to each other. The master apparatus controls the cell stack of the master apparatus on the basis of control information. The first slave apparatus controls the cell stack of the first slave apparatus and the second slave apparatus controls the cell stack of the second slave apparatus on the basis of the control information acquired from the master apparatus. The first slave apparatus transmits a master candidacy message indicating assumption by proxy of functionality of the master apparatus to the second slave apparatus when the first slave apparatus detects that the master apparatus has lost functionality.

A control method according to an embodiment of the present disclosure is a control method for a fuel cell system. The fuel cell system comprises a plurality of fuel cell apparatuses that includes a master apparatus and slave apparatuses including a first slave apparatus and a second slave apparatus. The master apparatus, the first slave apparatus, and the second slave apparatus each comprise a cell stack. The master apparatus, the first slave apparatus, and the second slave apparatus communicably connect to each other. The control method for a fuel cell system comprises controlling, using the master apparatus, the cell stack of the master apparatus on the basis of control information. The control method for a fuel cell system comprises controlling, using the first slave apparatus, the cell stack of the first slave apparatus and controlling, using the second slave apparatus, the slave stack of the second slave apparatus on the basis of the control information acquired from the master apparatus. The control method for a fuel cell system comprises transmitting, using the first slave apparatus, a master candidacy message indicating assumption by proxy of functionality of the master apparatus to the second slave apparatus when the first slave apparatus detects that the master apparatus has lost functionality.

DETAILED DESCRIPTION

Connected operation of a plurality of power source apparatuses is sometimes performed by configuring one power source apparatus as a master apparatus and the rest as slave apparatuses to which the master apparatus issues control instructions. In this case, a problem occurring in the master apparatus could jeopardize continued operation of the slave apparatuses. If the power supply for the load ceases or becomes unstable, the reliability of the system performing connected operation is compromised.

The fuel cell apparatus, fuel cell system, control method for a fuel cell system, and controller according to the present disclosure can improve the reliability of a fuel cell system that operates a plurality of fuel cell apparatuses by connected operation.

Embodiment

[System Configuration]

Figure 1:
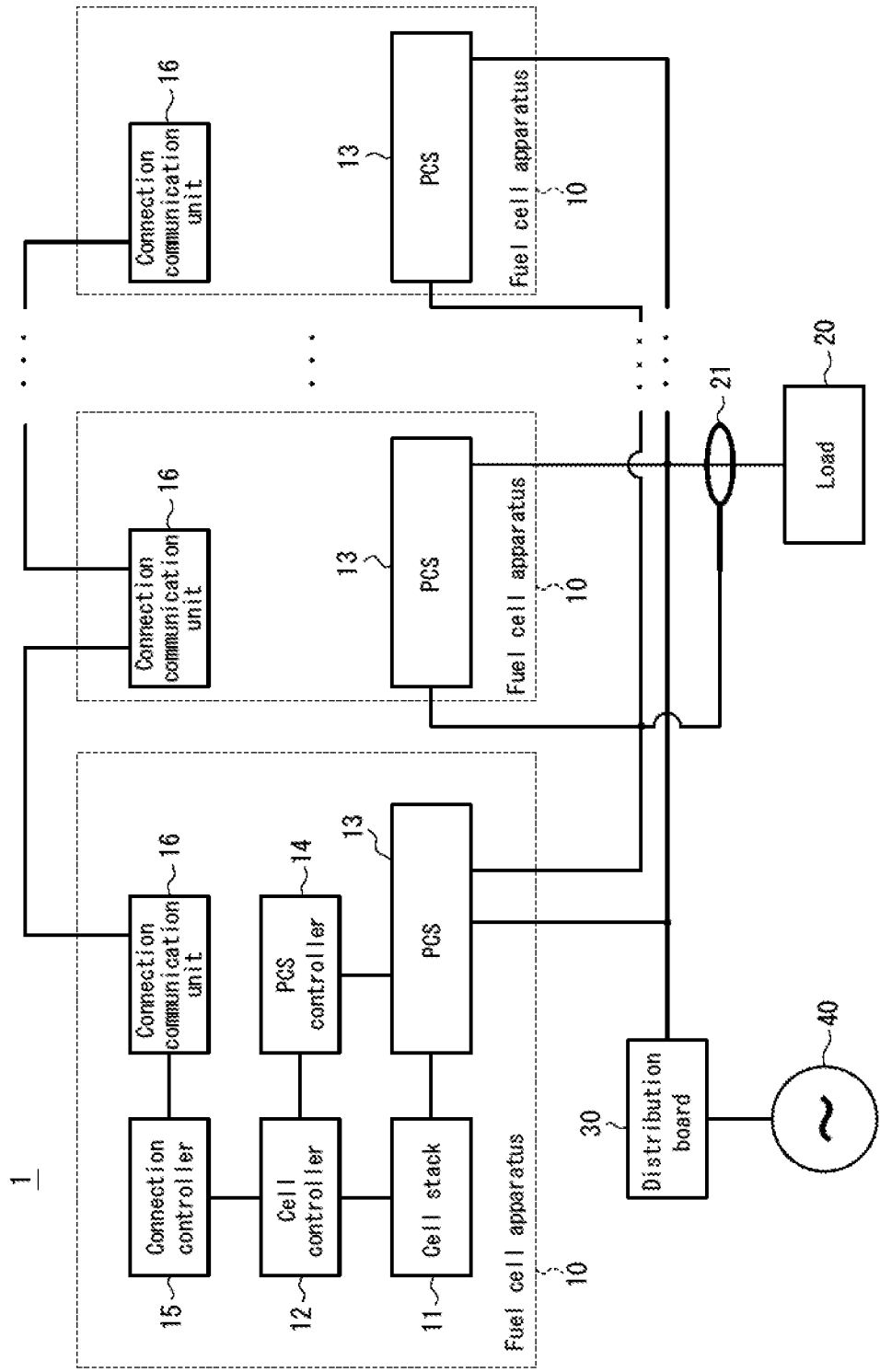
FIG. 1 illustrates an example schematic configuration of a fuel cell system according to an embodiment.

As illustrated in FIG. 1, the fuel cell system 1 includes a plurality of fuel cell apparatuses 10. The fuel cell apparatuses 10 connect to each other and perform connected operation. Each fuel cell apparatus 10 connects to a load 20 and can supply electric power to the load 20. The fuel cell apparatuses 10 and the load 20 connect to a power grid 40 through a distribution board 30.

The fuel cell apparatus 10 includes a cell stack 11, a cell controller 12, and a power conditioning system (PCS) 13. The PCS 13 is also known as a power control apparatus. The fuel cell apparatus 10 further includes a PCS controller 14, a connection controller 15, and a connection communication unit 16. The connection controller 15 and the connection communication unit 16 are provided so as to be included in the fuel cell apparatus 10. The connection controller 15 and the connection communication unit 16 may each be provided outside of the fuel cell apparatus 10 as a separate control apparatus and connect to the fuel cell apparatus 10. The cell controller 12 and the connection controller 15 are also collectively referred to as a controller. The connection communication unit 16 is also referred to as a communication unit.

The cell stack 11 is a fuel cell. The cell stack 11 may, for example, be a polymer electrolyte fuel cell (PEFC) or a solid oxide fuel cell (SOFC). The cell stack 11 is not limited to these examples and may be a different fuel cell. The cell stack 11 connects to the cell controller 12. The cell controller 12 controls the power generation by the cell stack 11.

The cell stack 11 connects to the PCS 13. The PCS 13 converts the DC power generated by the cell stack 11 to AC power and supplies the AC power to the load 20. The PCS 13 is also referred to as a power conversion apparatus. The PCS 13 connects to the PCS controller 14. The PCS controller 14 also connects to the cell controller 12. The PCS controller 14 cooperates with the cell controller 12 to control AC power output of the PCS 13.

The cell controller 12 further connects to the connection controller 15. The connection controller 15 connects to the connection communication unit 16. The connection communication unit 16 communicably connects to the connection communication units 16 of other fuel cell apparatuses 10. The connection communication unit 16 transmits control information pertaining to the respective apparatus and acquires control information pertaining to the other fuel cell apparatuses 10. The cell controller 12 cooperates with the directly connected connection controller 15 or with the connection controller 15 of another fuel cell apparatus 10 connected via the connection communication unit 16. The cell controller 12 controls the power generation by the cell stack 11 on the basis of acquired control information. The connection controller 15 can also be said to control the power generation by the cell stack 11 through the cell controller 12.

The control information includes a signal or information exchanged between fuel cell apparatuses 10 performing connected operation. For example, the control information includes a status request, response information, an instruction to control power generation, or the like.

The connection communication units 16 of the fuel cell apparatuses 10 serially connect to each other in accordance with the RS-485 standard, for example. The connection communication units 16 of the fuel cell apparatuses 10 may, for example, connect in a daisy chain. The connection between the connection communication units 16 is not limited to these examples. For example, the connection communication units 16 may connect to a bus line.

When the connection communication units 16 are connected in a daisy chain, the signal transmitted from one fuel cell apparatus 10 is acquired by all of the other fuel cell apparatuses 10 connected in the daisy chain. In other words, the connection communication units 16 communicate with each other as if they were connected to a bus line. In this case, information designating the fuel cell apparatus 10 that is the recipient is included in the signal. One fuel cell apparatus 10 or all of the other fuel cell apparatuses 10 may be designated as the recipient. The transmission of a signal or information from the connection communication unit 16 to the connection communication unit 16 of another fuel cell apparatus 10 connected in the daisy chain is also referred to as a broadcast.

A current sensor 21 is provided in the power line that supplies electric power to the load 20. The current sensor 21 measures the current of the load 20. The current sensor 21 connects to the PCS 13 of each fuel cell apparatus 10. The PCS 13 can acquire the power consumption of the load 20 by acquiring the measured value of the current sensor 21.

[Connected Operation]

When the fuel cell apparatuses 10 perform connected operation, one fuel cell apparatus 10 is set as a master apparatus. The other fuel cell apparatuses 10 are set as slave apparatuses. From the perspective of a particular fuel cell apparatus 10, one fuel cell apparatus 10 from among the particular fuel cell apparatus 10 and the other fuel cell apparatuses 10 is set as the master apparatus. The remaining fuel cell apparatuses 10, including the particular fuel cell apparatus 10, are set as slave apparatuses. In the present embodiment, four fuel cell apparatuses 10 perform connected operation. The number of fuel cell apparatuses 10 performing connected operation is not limited to four and may be either less or greater than four. When four fuel cell apparatuses 10 are performing connected operation, the fuel cell apparatuses 10 are set each to correspond to one of a master apparatus and slave apparatuses A, B, and C. The slave apparatus A can be distinguished as a first slave apparatus. The slave apparatuses B and C can be distinguished as second slave apparatuses. The slave apparatus distinguished as the first slave apparatus is not limited to the slave apparatus A and may instead be the slave apparatus B or the slave apparatus C. The slave apparatus A may be distinguished as the second slave apparatus. The indication of slave apparatuses "A", "B", and "C" and the indication of "first" and "second" slave apparatuses are for distinguishing the slave apparatuses by identifiers. The identifiers "A", "B", and "C", along with "first" and "second", may be interchanged or replaced with other identifiers.

Figure 2:
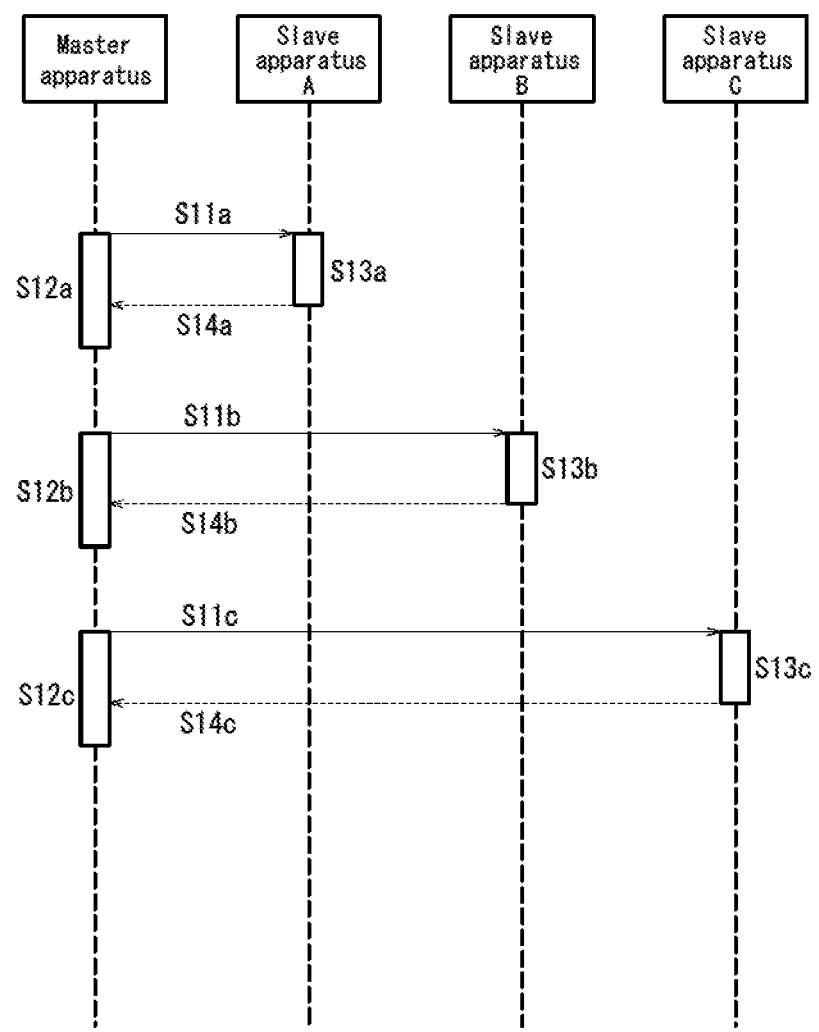
FIG. 2 is a sequence diagram illustrating an example of operations for connected operation by fuel cell apparatuses.

As illustrated in FIG. 2, the connection controller 15 of the master apparatus transmits a status request to the slave apparatus A (step S11a). The transmission of the status request is performed through the connection communication unit 16. The master apparatus enters a response waiting state (step S12a).

Upon receiving the status request from the master apparatus, the slave apparatus A generates response information indicating the state of the fuel cell apparatus 10 set as the slave apparatus A (step S13a). The generated power, operating time, degradation information, the number of times maintenance has been performed, the number of times an abnormality has occurred, or the like for the fuel cell apparatus 10 are included in the response information.

The slave apparatus A transmits the generated response information to the master apparatus (step S14a). The transmission of the response information is performed through the connection communication unit 16. When the master apparatus successfully acquires the response information from the slave apparatus A while waiting for the response in step S12a (when not timing out), the master apparatus judges that response information could be acquired normally from the slave apparatus A.

The master apparatus transmits a status request to each of the slave apparatuses B and C as well. The master apparatus acquires the response information from the slave apparatuses B and C (steps S11$b$ to S14$b$ and steps S11$c$ to S14$c$).

On the basis of the response information acquired from the slave apparatuses A, B, and C, the connection controller 15 of the master apparatus calculates the total generated power as the sum of the generated power of each fuel cell apparatus 10. The connection controller 15 of the master apparatus acquires the power consumption of the load 20 through the PCS 13 and determines the generated power of each fuel cell apparatus 10 on the basis of a comparison with the total generated power. The connection communication unit 16 of the master apparatus broadcasts an instruction to control power generation to each fuel cell apparatus 10.

The connection communication unit 16 of the master apparatus may transmit the control instruction for controlling the power generation of the slave apparatus to each slave apparatus with a sequence similar to the transmission of the status request. The control instruction may be transmitted by being included in the status request.

<Operations During Loss of Master Apparatus>

In the above-described connected operation, the master apparatus acquires response information indicating the state of the slave apparatuses and transmits control instructions to the slave apparatuses. When a problem occurs in the master apparatus and operation of the master apparatus is discontinued, then the aforementioned operations are not executed, and operation of the slave apparatuses is also discontinued. When a problem occurs in the master apparatus, a master apparatus is automatically selected in the present embodiment from among the slave apparatuses and set as the new master apparatus. Operation of the slave apparatuses thus continues.

Figure 3:
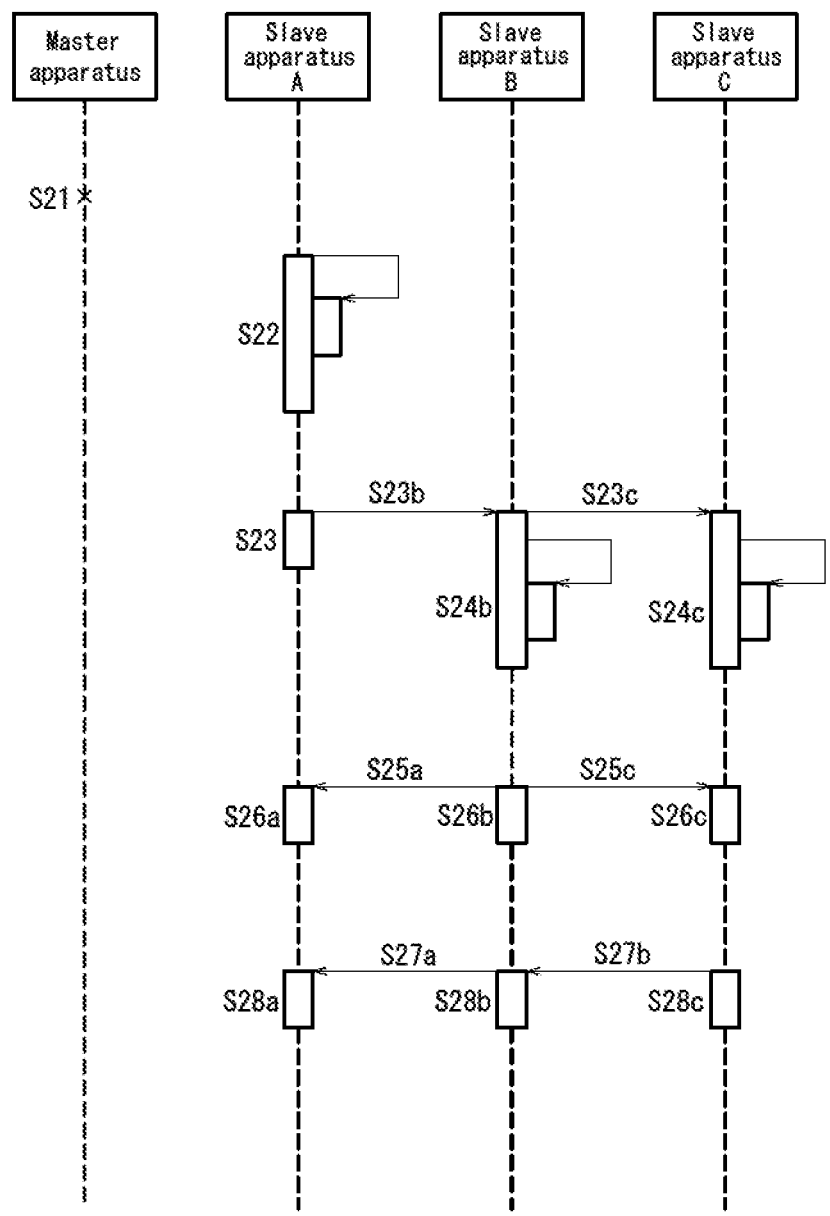
FIG. 3 is a sequence diagram illustrating an example of operations by which a master apparatus is automatically selected from among slave apparatuses.

As illustrated in FIG. 3, when a problem occurs in the master apparatus, the master apparatus stops operating (step S21).

When the slave apparatus A cannot acquire a status request from the master apparatus after at least a predetermined period has elapsed, the slave apparatus A performs a timeout process. The slave apparatus A judges that a problem has occurred in the master apparatus causing loss of functionality in the master apparatus (step S22).

The slave apparatus A broadcasts a master candidacy message to the slave apparatus B and the slave apparatus C (steps S23$b$ and S23$c$). The master candidacy message is a message indicating that an apparatus is offering itself as a candidate to be the new master apparatus to assume the functionality of the master apparatus by proxy. The slave apparatus A performs a process to add itself to a candidate list as a candidate apparatus (step S24$a$). The slave apparatus B and slave apparatus C can detect that the master apparatus has lost functionality by acquiring the master candidacy message from the slave apparatus A. The slave apparatus B and the slave apparatus C suspend acquisition of the status request from the master apparatus (steps S24$b$ and S24$c$). The slave apparatus B and the slave apparatus C further perform a process to add the slave apparatus A to the candidate list as a candidate apparatus.

When the slave apparatus B detects that the master apparatus has lost functionality, then like the slave apparatus A, the slave apparatus B broadcasts a master candidacy message to the slave apparatus A and the slave apparatus C (steps S25$a$ and S25$c$). The slave apparatus B performs a process to add itself to the candidate list as a candidate apparatus (step S26$b$). After acquiring the master candidacy message from the slave apparatus B, the slave apparatus A and the slave apparatus C perform a process to add the slave apparatus B to the candidate list as a candidate apparatus (steps S26$a$ and S26$c$).

Like the slave apparatus B, when the slave apparatus C detects that the master apparatus has lost functionality, the slave apparatus C broadcasts a master candidacy message to the slave apparatus A and the slave apparatus B (steps S27$a$ and S27$b$). The slave apparatus C performs a process to add itself to the candidate list as a candidate apparatus (step S28$c$). After acquiring the master candidacy message from the slave apparatus C, the slave apparatus A and the slave apparatus B perform a process to add the slave apparatus C to the candidate list as a candidate apparatus (steps S28$a$ and S28$b$).

The master candidacy message is broadcast to all of the slave apparatuses. In this case, the candidate list acquired by each slave apparatus is the same. Information indicating the state of each slave apparatus may be included in the master candidacy message. By including information indicating the state of each slave apparatus in the master candidacy message, the state of the respective apparatus and the state of other candidate apparatuses can be shared with the other candidate apparatuses when determining the master apparatus.

Figure 4:
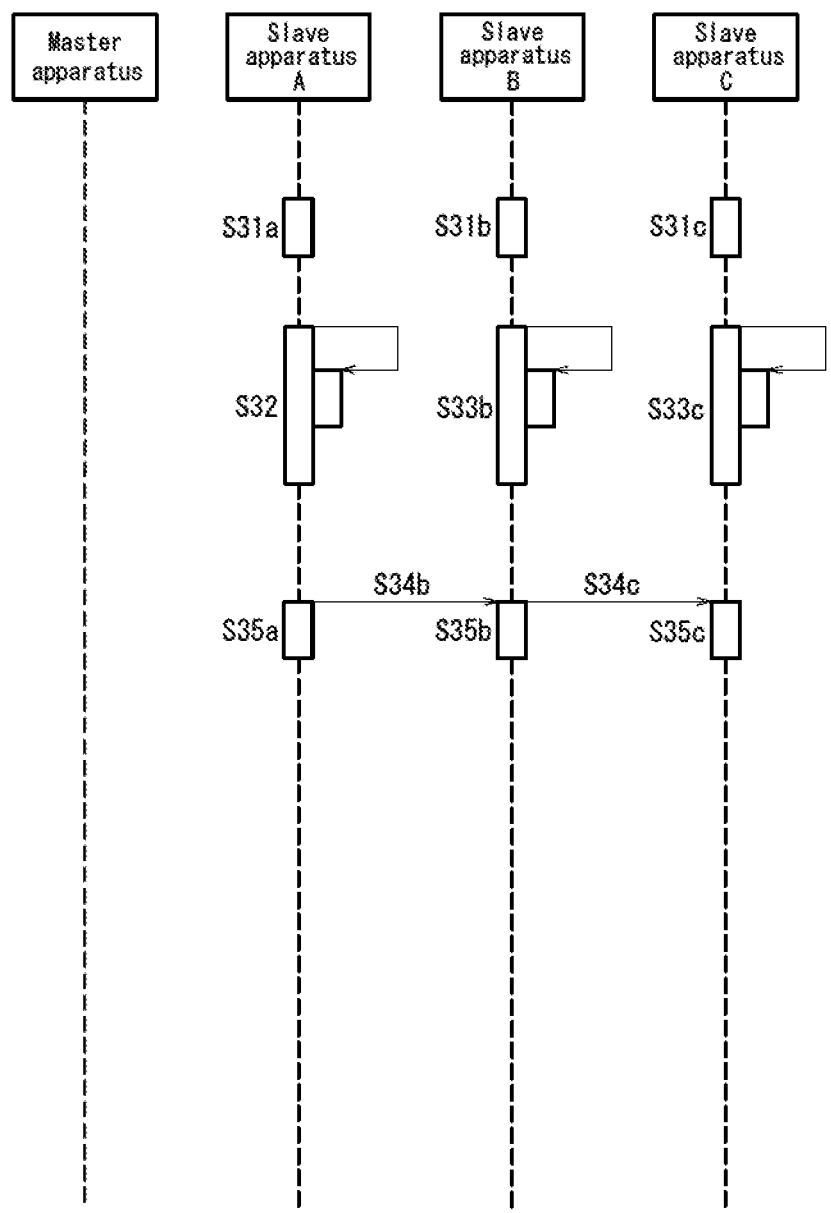
FIG. 4 is a sequence diagram illustrating an example of operations by which a master apparatus is automatically selected from among slave apparatuses.

As illustrated in FIG. 4, the slave apparatus A, slave apparatus B, and slave apparatus C each determine the new master apparatus from among the candidate apparatuses (steps S31$a$ to S31$c$). Each slave apparatus determines the new master apparatus on the basis of a shared algorithm. Each slave apparatus can uniquely determine the new master apparatus by sharing the state of the respective apparatus and the state of the other candidate apparatuses with the other candidate apparatuses. Instead of all of the slave apparatuses A, B, and C, at least one of the slave apparatuses A, B, and C may be the slave apparatus that determines the master apparatus.

The algorithm for determining the master apparatus may, for example, be a comparison of the utilization rate of each fuel cell apparatus 10 as calculated on the basis of information indicating the state of each fuel cell apparatus 10. In this case, the fuel cell apparatus 10 with the highest utilization rate may be determined to be the master apparatus. The information indicating the state of the fuel cell apparatus 10 includes a parameter indicating the state of health of the fuel cell apparatus 10, such as the operating time, degree of degradation, the number of times maintenance has been performed, the number of times an abnormality has occurred, or the like for the fuel cell apparatus 10. By adopting such a determination algorithm, the overall utilization rate can be increased when performing connected operation that is highly dependent on the master apparatus in the fuel cell system 1.

It may not be possible to determine the master apparatus by comparing the utilization rate in cases such as when a plurality of fuel cell apparatuses 10 is newly installed and begins to operate at once. In this case, the master apparatus may be determined by how large the manufacturing number of the fuel cell apparatuses 10 is. With this approach, the master apparatus can always be determined uniquely.

In steps S31$a$ to S31$c$ of FIG. 4, each slave apparatus determines the slave apparatus A to be the new master apparatus. Instead of all of the slave apparatuses A, B, and C, at least one of the slave apparatuses A, B, and C may be the slave apparatus that determines the slave apparatus A to be the new master apparatus. When the slave apparatus A is determined to be the new master apparatus, the slave apparatus A performs a process to transition from the state of being a candidate master apparatus to a state of being determined as the master apparatus (step S32). The slave apparatus B and the slave apparatus C perform a process to withdraw their candidacy from the state of being a candidate master apparatus (steps S33b and S33c).

The slave apparatus A broadcasts a master determination notification, indicating that the slave apparatus A has been determined to be the master apparatus, to the slave apparatus B and the slave apparatus C (steps S34b and S34c). The slave apparatus A performs a process to set itself as the master apparatus (step S35a). After acquiring the master determination notification from the slave apparatus A, the slave apparatus B and the slave apparatus C perform a process to recognize that the slave apparatus A has been set as the master apparatus (step S35b and S35c).

Figure 5:
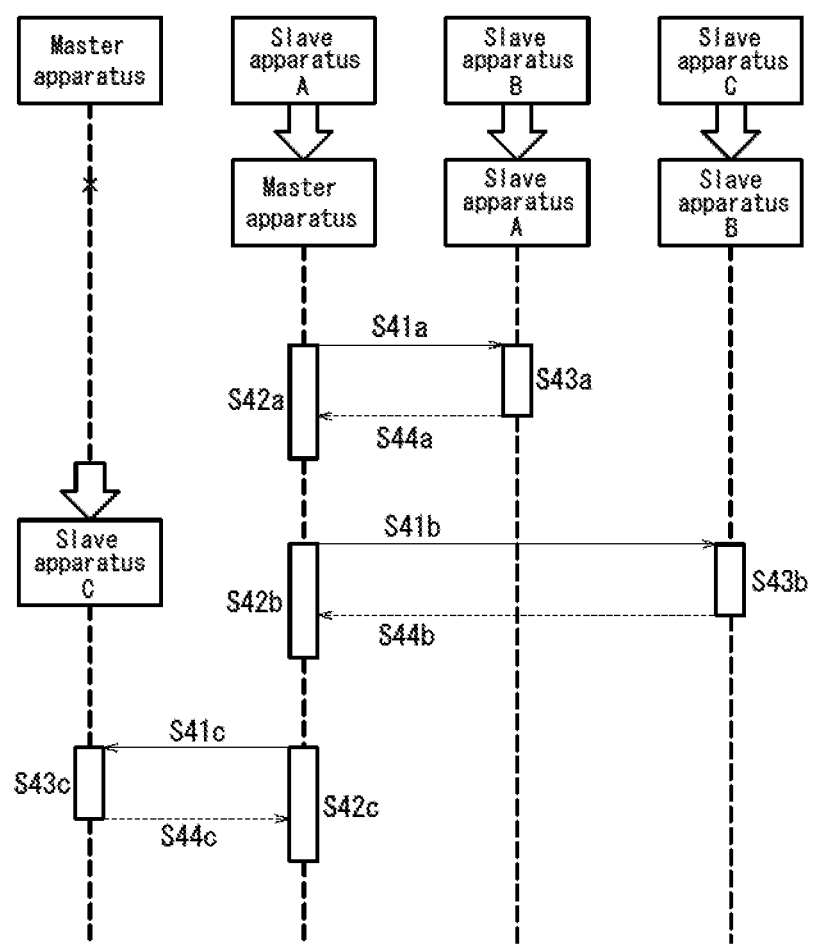
FIG. 5 is a sequence diagram illustrating an example of operations after a new master apparatus is determined.

As illustrated in FIG. 5, the fuel cell apparatus 10 that was the slave apparatus A in FIG. 3 and FIG. 4 is newly set as the master apparatus. The fuel cell apparatuses 10 that were the slave apparatus B and the slave apparatus C in FIGS. 3 and 4 are newly set as the slave apparatus A and the slave apparatus B. The labels A, B, and C attached to the slave apparatuses are simply for distinguishing the slave apparatuses and do not signify any order of priority among the slave apparatuses. In FIG. 5, the original slave apparatus B is described as being newly set as the slave apparatus A, but the original slave apparatus B may continue to be set as the slave apparatus B.

The connection controller 15 of the newly set master apparatus transmits a status request to the newly set slave apparatus A (step S41a). The transmission of the status request is performed through the connection communication unit 16. The master apparatus enters a response waiting state (step S42a).

Upon receiving the status request from the master apparatus, the slave apparatus A generates response information indicating the state of the fuel cell apparatus 10 set as the slave apparatus A (step S43a).

The slave apparatus A transmits the generated response information to the master apparatus (step S44a). The transmission of the response information is performed through the connection communication unit 16. When the master apparatus successfully acquires the response information from the slave apparatus A while waiting for the response in step S42a, the master apparatus judges that normal acquisition of the response information from the slave apparatus A is successful. The case of successfully acquiring the response information from the slave apparatus A while waiting for the response in step S42a can also be referred to as not timing out.

The master apparatus transmits a status request to the newly set slave apparatus B as well and acquires response information from the slave apparatus B (steps S41b to S44b).

The fuel cell apparatus 10 that was the master apparatus in FIG. 3 and FIG. 4 receives maintenance or repair while connected operation is being performed by the newly set master apparatus and then returns to a normal state and resumes operation. At this time, this fuel cell apparatus 10 is newly set as the slave apparatus C.

The master apparatus transmits a status request to the newly set slave apparatus C as well, as for the slave apparatus A and the slave apparatus B, and acquires response information from the slave apparatus C (steps S41c to S44c).

When a problem occurs in the master apparatus causing the master apparatus in connected operation to be lost, the above-described operations during loss of the master apparatus allow each of the normally operating slave apparatuses to uniquely determine a new master apparatus. Connected operation of the fuel cell system 1 overall can thus continue.

Although exemplary embodiments have been described with reference to the accompanying drawings, it is to be noted that various changes and modifications will be apparent to those skilled in the art based on the present disclosure. Therefore, such changes and modifications are to be understood as included within the scope of the disclosure. For example, the functions and the like included in the various components and steps may be reordered in any logically consistent way. Furthermore, components or steps may be combined into one or divided. While the present disclosure has been described focusing on apparatuses, the present disclosure may also be embodied as a method that includes steps performed by the components of an apparatus. Furthermore, while the present disclosure has been described focusing on apparatuses, the present disclosure may also be embodied as a method or program executed by a processor provided in an apparatus, or as a recording medium on which a program is recorded. Such embodiments are also to be understood as included in the scope of the present disclosure.

The invention claimed is:

1. A fuel cell apparatus corresponding to a first slave apparatus among a plurality of fuel cell apparatuses that includes a master apparatus and slave apparatuses including the first slave apparatus and a second slave apparatus, the fuel cell apparatus comprising:
   a cell stack;
   a communication unit; and
   at least one controller,
wherein
   the communication unit communicably connects to the master apparatus and the second slave apparatus,
   the at least one controller controls the cell stack on the basis of control information acquired from the master apparatus,
   the at least one controller transmits a master candidacy message indicating assumption by proxy of functionality of the master apparatus to the second slave apparatus from the communication unit when the at least one controller detects that the master apparatus has lost functionality, and
   the at least one controller causes the second slave apparatus to receive the master candidacy message, thereby causing the second slave apparatus to detect that the master apparatus has lost functionality, when the at least one controller detects that the master apparatus has lost functionality before the second slave apparatus detects the same.

2. The fuel cell apparatus of claim 1, wherein the at least one controller determines one slave apparatus to be a new master apparatus from among slave apparatuses that have transmitted the master candidacy message when the communication unit acquires the master candidacy message from the second slave apparatus.

3. The fuel cell apparatus of claim 2, wherein
   the at least one controller
      shares, with the slave apparatuses that have transmitted the master candidacy message, information indicating a state of each of the slave apparatuses that have transmitted the master candidacy message and
      determines, on the basis of a shared algorithm, the one slave apparatus to be the new master apparatus from among the slave apparatuses that have transmitted the master candidacy message.

4. The fuel cell apparatus of claim 3, wherein the information indicating the state is at least one of an operating time, a degree of degradation, the number of times maintenance has been performed, or the number of times an abnormality has occurred in the slave apparatuses that have transmitted the master candidacy message.

5. A fuel cell system comprising:
a plurality of fuel cell apparatuses that includes a master apparatus and slave apparatuses including a first slave apparatus and a second slave apparatus;
wherein
the master apparatus, the first slave apparatus, and the second slave apparatus each comprise a cell stack,
the master apparatus, the first slave apparatus, and the second slave apparatus communicably connect to each other,
the master apparatus controls the cell stack of the master apparatus on the basis of control information,
the first slave apparatus controls the cell stack of the first slave apparatus and the second slave apparatus controls the cell stack of the second slave apparatus on the basis of the control information acquired from the master apparatus,
the first slave apparatus transmits a master candidacy message indicating assumption by proxy of functionality of the master apparatus to the second slave apparatus when the first slave apparatus detects that the master apparatus has lost functionality, and
the second slave apparatus determines that the master apparatus has lost functionality when the second slave apparatus acquires the master candidacy message transmitted from the first slave apparatus, without the second slave apparatus having detected by itself that the master apparatus has lost functionality.

6. The fuel cell system of claim 5, wherein the first slave apparatus sets one slave apparatus as a new master apparatus from among slave apparatuses that have transmitted the master candidacy message when the first slave apparatus acquires the master candidacy message from the second slave apparatus.

7. The fuel cell system of claim 6, wherein
each of the slave apparatuses that have transmitted the master candidacy message shares information indicating a state of said each slave apparatus with the first slave apparatus, and
the first slave apparatus determines, on the basis of a shared algorithm, the one slave apparatus to be the new master apparatus from among the slave apparatuses that have transmitted the master candidacy message.

8. The fuel cell system of claim 7, wherein the information indicating the state is at least one of an operating time, a degree of degradation, the number of times maintenance has been performed, or the number of times an abnormality has occurred in the slave apparatuses that have transmitted the master candidacy message.

9. A control method for a fuel cell system, the fuel cell system comprising a plurality of fuel cell apparatuses that includes a master apparatus and slave apparatuses including a first slave apparatus and a second slave apparatus, the master apparatus, the first slave apparatus, and the second slave apparatus each comprising a cell stack, the master apparatus, the first slave apparatus, and the second slave apparatus communicably connecting to each other, the method comprising:
controlling, using the master apparatus, the cell stack of the master apparatus on the basis of control information;
controlling, using the first slave apparatus, the cell stack of the first slave apparatus and controlling, using the second slave apparatus, the slave stack of the second slave apparatus on the basis of the control information acquired from the master apparatus;
transmitting, using the first slave apparatus, a master candidacy message indicating assumption by proxy of functionality of the master apparatus to the second slave apparatus when the first slave apparatus detects that the master apparatus has lost functionality; and
determining, using the second slave apparatus, that the master apparatus has lost functionality when the second slave apparatus acquires the master candidacy message transmitted from the first slave apparatus, without the second slave apparatus having detected by itself that the master apparatus has lost functionality.

10. The control method of claim 9, further comprising:
setting, using the first slave apparatus, one slave apparatus as a new master apparatus from among slave apparatuses that have transmitted the master candidacy message when the first slave apparatus acquires the master candidacy message from the second slave apparatus.

11. The control method of claim 10, further comprising:
sharing, using each of the slave apparatuses that have transmitted the master candidacy message, information indicating a state of said each slave apparatus with the first slave apparatus, and
determining using the first slave apparatus, on the basis of a shared algorithm, the one slave apparatus to be the new master apparatus from among the slave apparatuses that have transmitted the master candidacy message.

12. The control method of claim 11, wherein the information indicating the state is at least one of an operating time, a degree of degradation, the number of times maintenance has been performed, or the number of times an abnormality has occurred in the slave apparatuses that have transmitted the master candidacy message.

13. The fuel cell apparatus of claim 1, wherein the at least one controller includes
a cell controller that controls the cell stack on the basis of control information acquired from the master apparatus, and
a connection controller that is connected with the cell controller and transmits the master candidacy message to the second slave apparatus when the first slave apparatus detects that the master apparatus has lost functionality.

14. The fuel cell system of claim 5, wherein
the master apparatus transmits a status request to the first and second slave apparatus, and
when the second slave apparatus receives from the first slave apparatus the master candidacy message indicating that the first slave apparatus detects that the master apparatus has lost functionality, the second slave apparatus suspends acquisition of the status request from the master apparatus.

15. The control method of claim 9, wherein
the master apparatus transmits a status request to the first and second slave apparatus, and
when the second slave apparatus receives from the first slave apparatus the master candidacy message indicating that the first slave apparatus detects that the master apparatus has lost functionality, the second slave apparatus suspends acquisition of the status request from the master apparatus.

* * * * *